United States Patent [19]

Gargour

[11] 4,066,289
[45] Jan. 3, 1978

[54] VEHICLE CARRIERS

[76] Inventor: Habib T. Gargour, c/o T. Gargour & Fils, Beirut, Lebanon

[21] Appl. No.: 663,772

[22] Filed: Mar. 4, 1976

[30] Foreign Application Priority Data

Mar. 6, 1975 Lebanon ......................................... 87
May 15, 1975 Lebanon ....................................... 161
May 17, 1975 Lebanon ....................................... 179
May 20, 1975 Lebanon ....................................... 180

[51] Int. Cl.² .............................................. B60P 1/00
[52] U.S. Cl. ................................ 296/1 A; 280/179 R
[58] Field of Search ................. 296/1 A, 28 F, 36, 43; 280/143, 147, 179 R, 106 T, 106 R

[56] References Cited

U.S. PATENT DOCUMENTS

| 1,333,990 | 3/1920 | Mills | 296/43 |
| 1,454,037 | 5/1923 | Byrne | 280/143 |
| 2,471,096 | 5/1949 | Golorigh | 280/143 |
| 2,631,885 | 3/1953 | Ault | 280/179 R |

Primary Examiner—Philip Goodman

[57] ABSTRACT

Disclosed herein is a new and improved support assembly arranged to support a load upon the chassis of a carrying vehicle, said assembly comprising at least one member arranged to be secured transversely to the longitudinal members of the vehicle chassis and provided with means arranged to assist in retaining a load thereupon.

8 Claims, 26 Drawing Figures

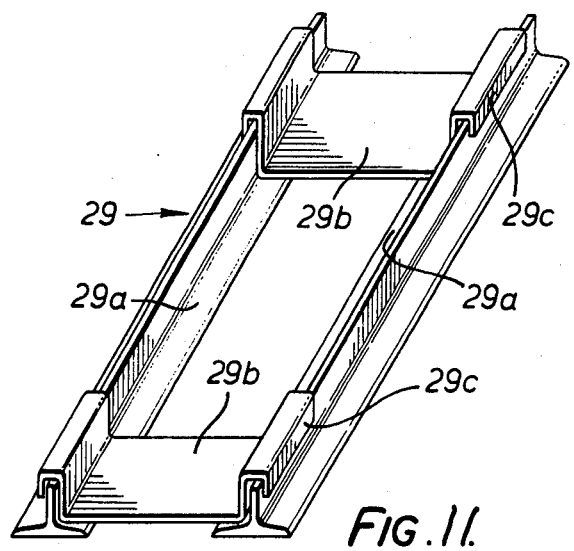
FIG. 11.
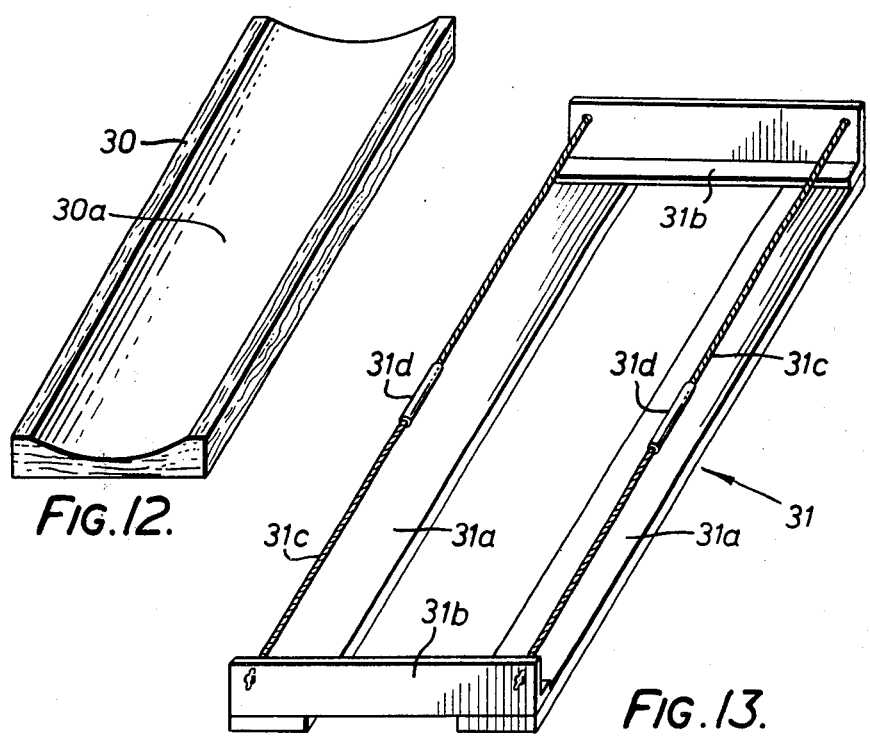
FIG. 12.
FIG. 13.

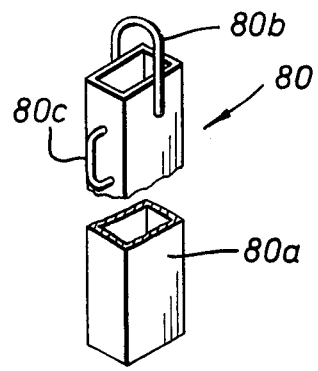
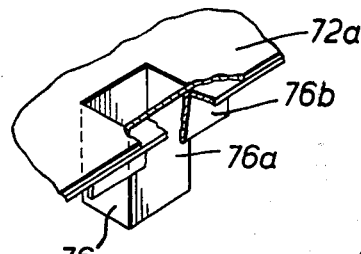
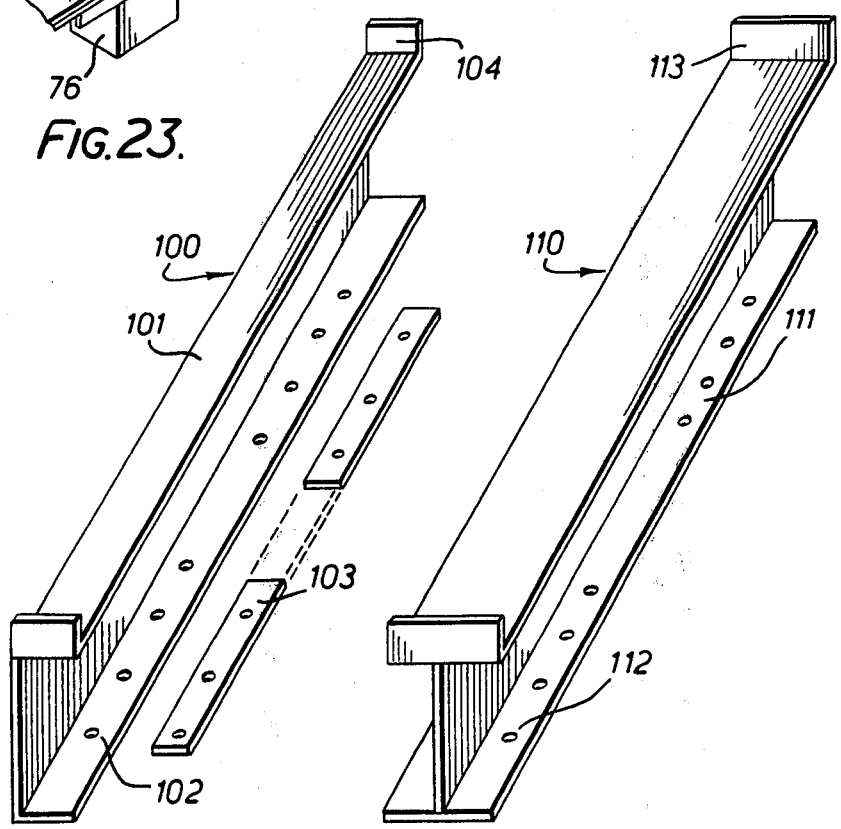
FIG. 23.
FIG. 24.
FIG. 25.

VEHICLE CARRIERS

SUMMARY OF THE PRESENT INVENTION

This invention relates to adaptable support members arranged to support a load upon a vehicle chassis.

The transport of vehicles, especially of vehicle chassis, is expensive. Because the driver's cab is always at least twice as high as the chassis itself, vehicles carried by ship, on railways or other means of transport occupy uselessly a considerable space on which full freightage must be paid, so that the cost of delivery is undesirably increased.

If a vehicle is delivered on its own wheels the wages of the driver, board and lodging, insurance, driver's return costs, cost of fuel and vehicle depreciation all add to the delivery cost.

The present invention provides a means whereby two vehicles, usually of different kinds, may be delivered for the same cost as one. Alternatively the invention may be used to secure some other load to the chassis of a vehicle.

According to the present invention there is provided a support assembly arranged to support a load upon the chassis of a carrying vehicle, said assembly comprising at least one member arranged to be secured transversely to the longitudinal members of the vehicle chassis and provided with means arranged to assist in retaining a load thereupon.

Embodiments of the invention will now be described with reference to the drawings of which:

DESCRIPTION OF THE DRAWINGS

FIGS. 4 – 17 show further embodiments of load support assemblies;

FIGS. 19 – 25 show additional embodiments of load support assemblies.

DETAILED DESCRIPTION OF THE PRESENT INVENTION

Figure 1:
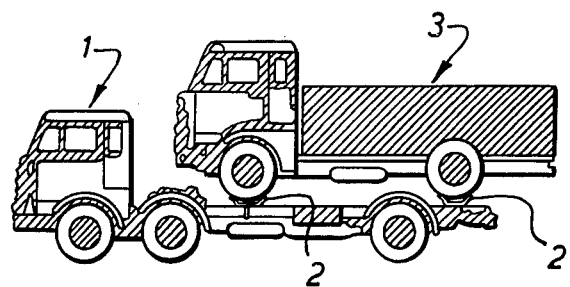
FIG. 1 shows how one vehicle to be delivered may, by the use of the present invention, be carried by another.

FIG. 1 shows how the chassis of a carrying vehicle 1 is provided with two support assemblies 2 in accordance with the invention, upon which is supported a carried vehicle 3. This enables the delivery cost to be reduced because a large amount of the space, on shipboard or elsewhere, otherwise uselessly occupied by the vehicle 1 is now usefully occupied. When delivered by road, a single driver only is needed instead of two and the carried vehicle will be delivered in new and unused condition, so that no depreciation need be allowed. In the simplest case, the support assemblies comprise cross-members formed of material strong enough to support one axle of a vehicle to be carried. Obviously each cross-member must have a length greater than the track of the carried vehicle and its cross-section is made such as to receive and locate the wheels of the supported axle.

Figure 2:
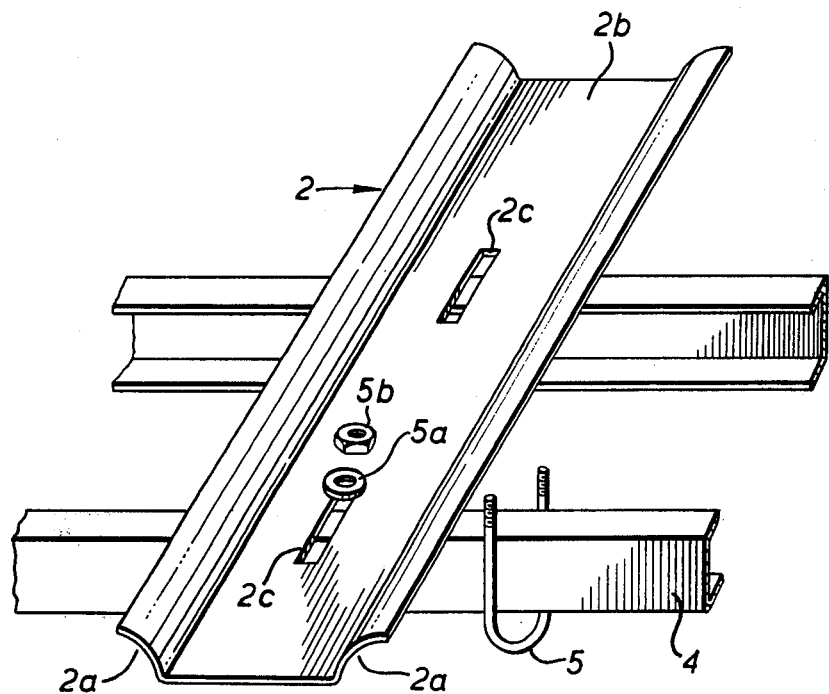
FIG. 2 shows one embodiment of vehicle support assembly in accordance with the invention, together with members of a vehicle chassis, showing how the members of the support assembly are secured thereto.

FIG. 2 shows one embodiment of load support assembly 2 in accordance with the invention. This embodiment comprises a channel-section steel member having outwardly curving quadrantal flange portions 2a extending from a flat web portion 2b. Web portion 2b is apertured at 2c to accept the upper ends of U-bolts such as 5 which embrace the chassis members 4 of the carrying vehicle 1. Washers 3a and nuts 3b are applied to each of the screw-threaded limbs of the U-bolts to secure the support member to the chassis. As an example, the length of the support member may be 2,500 cms, the web width 60 cms and the radius of the arcuate flanges 10 cms. Preferably, apertures 2c are either elongate slots, as shown, so as to allow the support member to be conveniently secured to vehicle chassis of different formations, or rows of spaced-apart holes may serve the same purpose.

Figure 3A:
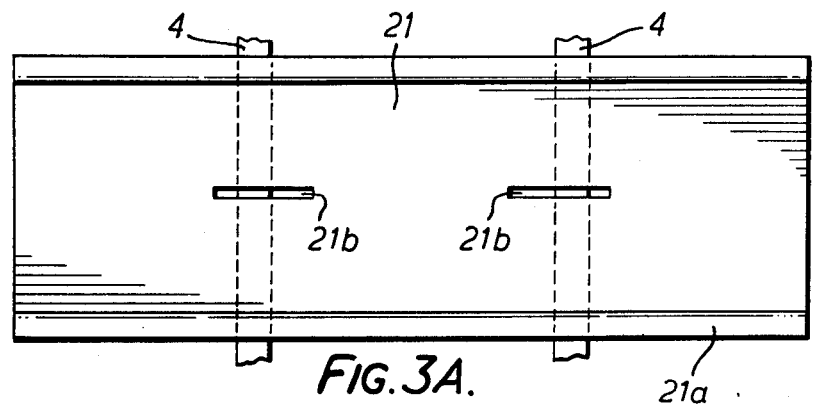
FIGS. 3A and 3B show two views of another embodiment of vehicle support assembly.
Figure 3B:
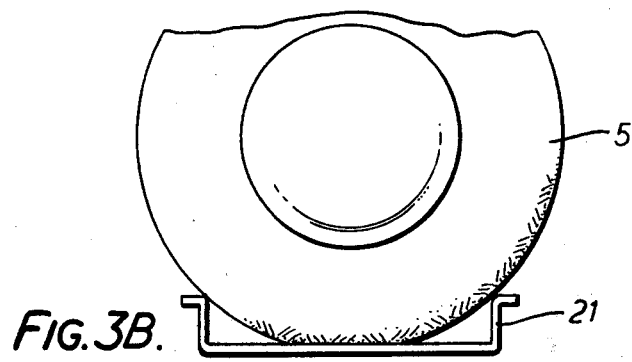

FIG. 3A shows a plan view and FIG. 3B an end elevation of a modified load support assembly, consisting of a 60 cm × 10 cm steel channel member 21 having out-turned subsidiary flanges 21a which may be 7.5 cm wide. Slots 21b, which may be 2 cm wide and 30 cm long, are provided in the web portion of member 21 to accommodate the fastening means by which the assembly is secured to the chassis members 4 of a vehicle. FIG. 3B shows how a wheel 5 of the carried vehicle fits into the support member 21.

Figure 4:
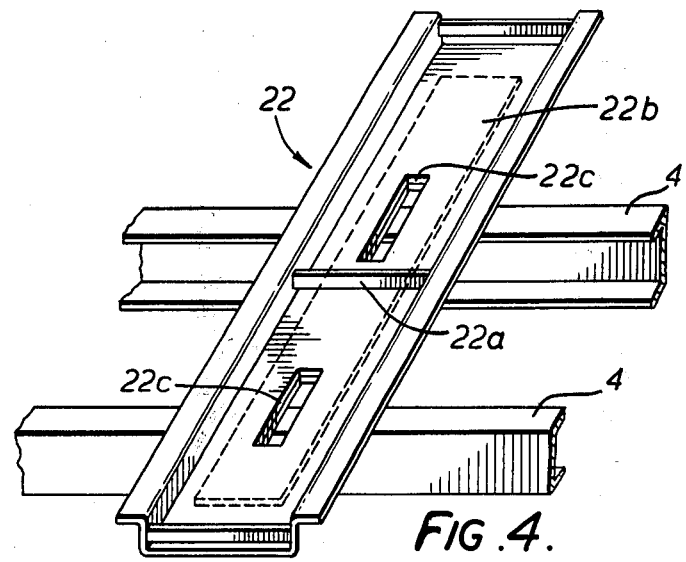

FIG. 4 shows a modification of the support assembly 21 of FIGS. 3A, 3B. The support assembly 22 again includes a 60 × 10 cm steel channel member with out-turned subsidiary flanges, but this member is strengthened by welded-on cross members 22a, one centrally disposed and one at each end, and by a reinforcing plate 22b which doubles a large part of the web portion of the support member. Slots 22c formed in the web portion of member 22 permit member 22 to be secured to chassis members 4.

Figure 5:
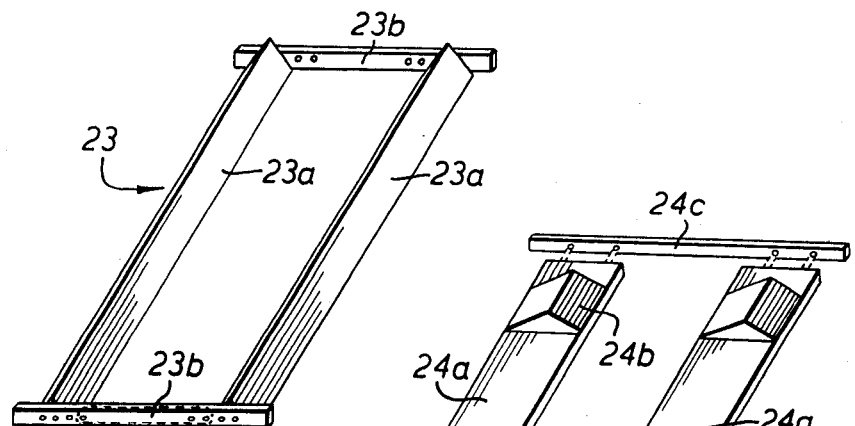

FIG. 5 shows a further embodiment of load support assembly, formed by two similar members 23 formed from steel plate as tubes of equilaterally triangular section. Suitable fastening means (not shown) are provided by which the two members may be secured to the chassis of a carrying vehicle and preferably further fastening means are provided at the ends of members 23 by which they may be secured to, preferably, multiperforate spacing members 23b by means of which the members 23 are fixedly spaced apart a distance suited to the wheels of the vehicle to be carried.

Figure 6:
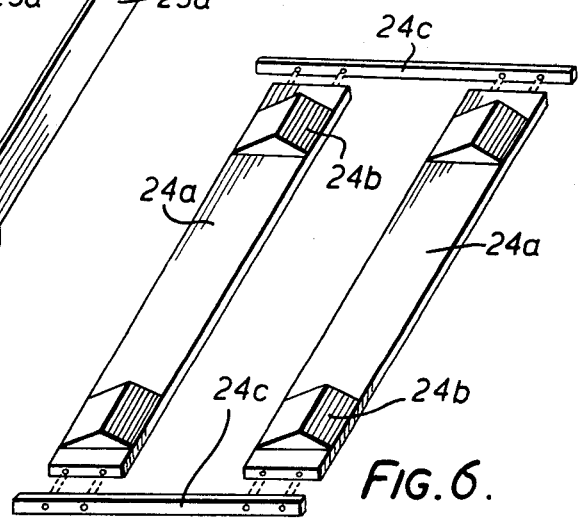

In the embodiment illustrated by FIG. 6 two flat steel members 24a are provided near their ends with upstanding triangular wheel chock portions 24b. Spacing members 24c may be secured by suitable means to the ends of members 24 to secure them a desired distance apart and appropriate means (not shown) are provided by which the assembly may be secured to the chassis of the carrying vehicle.

Figure 7:
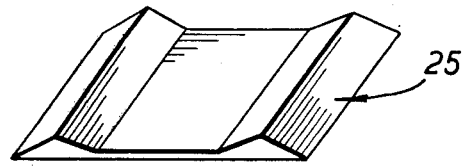

FIG. 7 shows a form of double chock 25, one of which may be secured to each end of any described support assembly arranged to be fastened to the chassis of a carrying vehicle.

Figure 8:
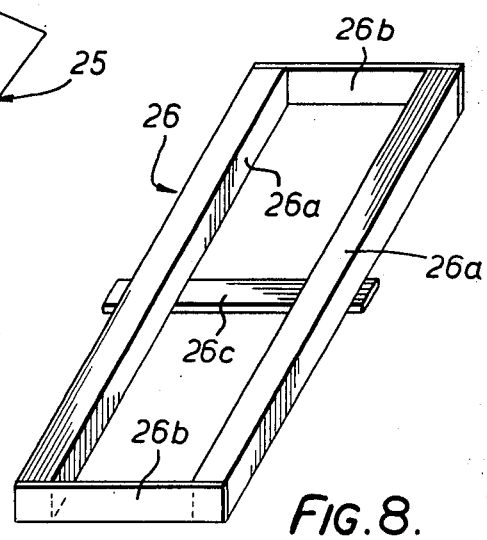

FIG. 8 shows a load support assembly 26 formed of two square-section tubular steel members 26a held apart by welded-on members 26b, 26c.

Figure 9:
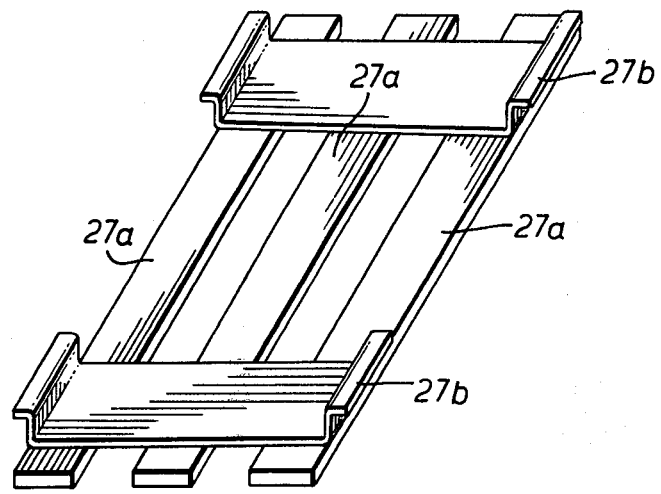

FIG. 9 shows a vehicle support 27 formed by three spaced-apart bar members 27a fixed to channel-section members 27b of a size to provide secure wheel chocking for a carried vehicle.

Figure 10:
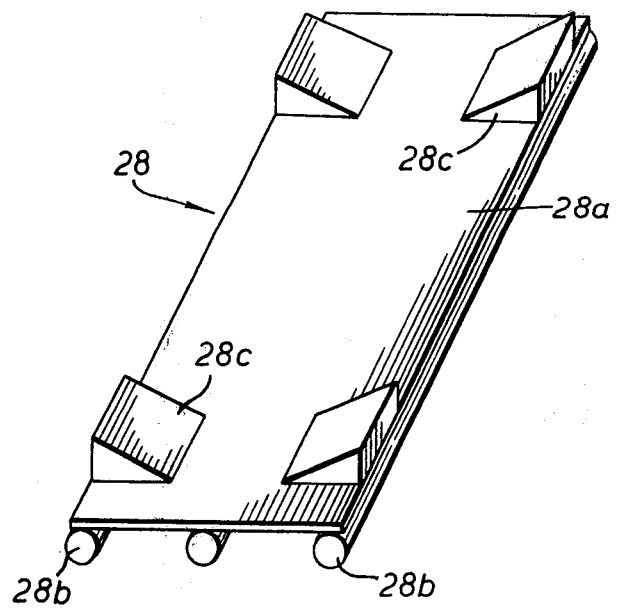

FIG. 10 shows a load support assembly formed by a steel plate 28a strengthened by three spaced-apart longitudinal rods 28b welded to its underside and having chocks 28c section welded to its upper surface.

FIG. 11 shows a load support assembly 29 formed by two inverted T-section steel bar members 29a held at a desired distance apart by channel-section chock members 29b having turned-over edges 29c which fit upon the web portions 29d of members 29a. This arrangement has the advantage that the position of chock members 29b is readily adjustable along the length of bar members 29a.

FIG. 12 shows a load support assembly 30 of a stout plank of wood having its upper surface arcuately channelled at 30a to accept the wheels of a carried vehicle.

FIG. 13 shows a vehicle support 31 formed by steel bars 31a spaced apart by angle sections 31b welded across their ends. Wheel restraint is here provided by wire cables 31c stretched between angle sections 31b by turnbuckles 31d.

Figure 14:
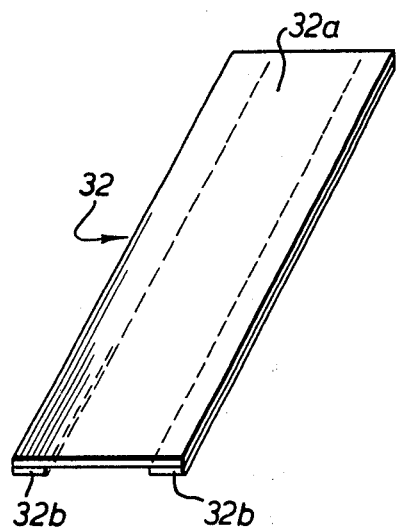

FIG. 14 shows a load support assembly 32 formed by a steel sheet 32a strengthened by welded on flat bars 32b secured to the longitudinal edges of its underside. Any convenient chocking means may be added to this support.

Figure 15:
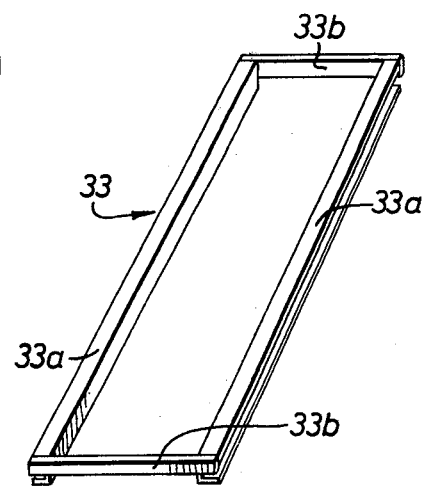

FIG. 15 shows a load support assembly 33 by C-section steel members 33a held together by welded-on bars 33b at their ends.

Figure 16:
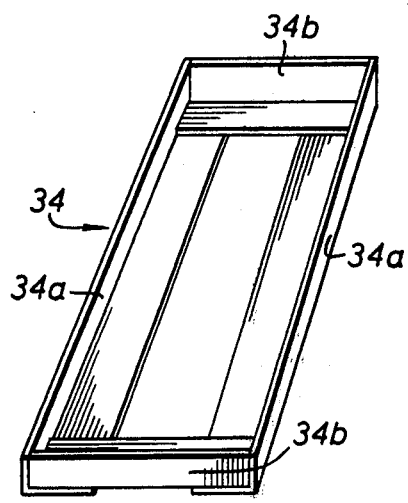

FIG. 16 shows a load support assembly 34 formed by angle-section steel members 34a which are preferably held together at an appropriate spacing by welded-on end members 34b, also of angle section, but may alternatively be secured individually to the chassis of the carrying vehicle. This alternative may also be adopted in all embodiments formed by two parallel members.

Figure 17:
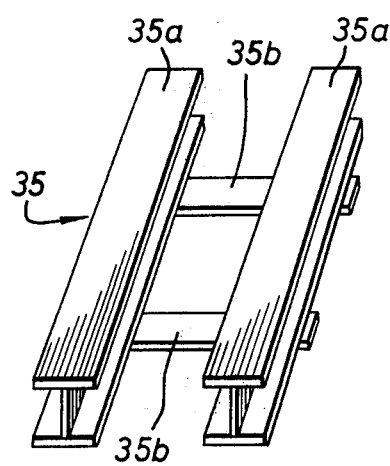

FIG. 17 shows a load support assembly 35 formed by two steel I-section members 35a preferably joined by flat plates 35b which may provide an anchorage for fastening means by which the support is secured to the chassis of the carrying vehicle. Alternatively or in addition the spacing between members 35a may be determined by multiperforate spacing members 35c secured to the ends of members 35a by releasable fastening means (not shown) or by permanently fastened angle-section members 35d.

Figure 18:
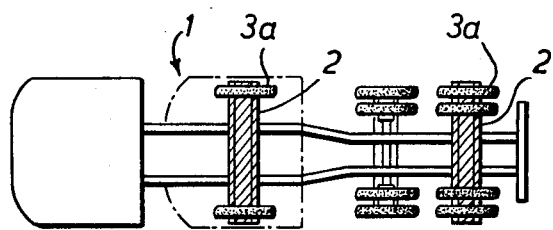
FIG. 18 shows a plan view of a vehicle chassis carrying another vehicle.

FIG. 18 shows a plan view of the carrying vehicle chassis 1 provided with vehicle support members 2 upon which are shown the wheels 3a only of a vehicle being carried.

Most motor vehicles chassis currently in production include elements which protrude above the level of the main chassis members, salients formed by pipes, fuel tanks and other accessories, usually situated towards the front of the chassis, and rear-wheel mud-guards towards the rear of the chassis.

The embodiments of the invention which have hitherto been described are intended to be secured to the chassis of a carrier vehicle at positions such that they will not come into contact with any projections on the chassis of the carrying vehicle. The transport of another vehicle upon the chassis of a carrying vehicle, using these simple embodiments of the invention presents no problems because the wheels of the carried vehicle raise its other parts sufficiently high to pass above the projections. In some cases the vehicle carriers could even be secured below the chassis members of the carrying vehicle, so as to reduce the overall height of the two superimposed vehicles.

When it is desired to support a container or similar extended load upon the chassis of a carrying vehicle, on the other hand, such containers usually having flat, uniform undersides, the support means must be such that the level of the container bottom is raised sufficiently far above the chassis of the carrying vehicle to pass above any upwardly projecting portions of the chassis and its equipment.

In addition, a container carried upon a carrying vehicle must usually be secured to the vehicle by means of wires, shackles, turnbuckles and so on, so that shifting of the container upon the carrying vehicle, with the possibility of consequent damage, is effectively prevented. It is also necessary for all the fastenings to be released when a container is to be removed from a carrying vehicle. Both the fastening and the removal are time-consuming operations and therefore costly.

According to a further aspect of the present invention, support assemblies arranged to be secured to a vehicle chassis are provided with twistlocks to receive and retain the bottom corner fittings of a container, these being standard devices used internationally for the purpose of securing containers during transport. Obviously, such twistlocks may be provided on all the described assemblies which are appropriate to support a distributed load.

Figure 19:
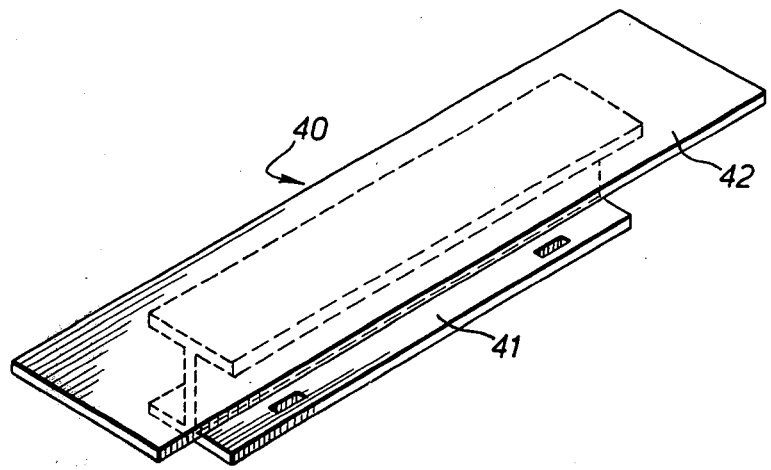

FIG. 19 shows an embodiment of load support assembly 40 which may be used to raise a load above the level of upwardly protruding parts of a chassis. A lower portion 41 in the form of an I-beam is provided with a bearing plate 42 which is raised by the portion 41 to a height above the upper surface of the chassis members, to which portion 41 is secured when in use, such that the load passes over any projections. Fastening means (not shown) are provided by which the support members may be secured to the chassis of the carrying vehicle and by which the load may be secured to the support members.

Figure 20:
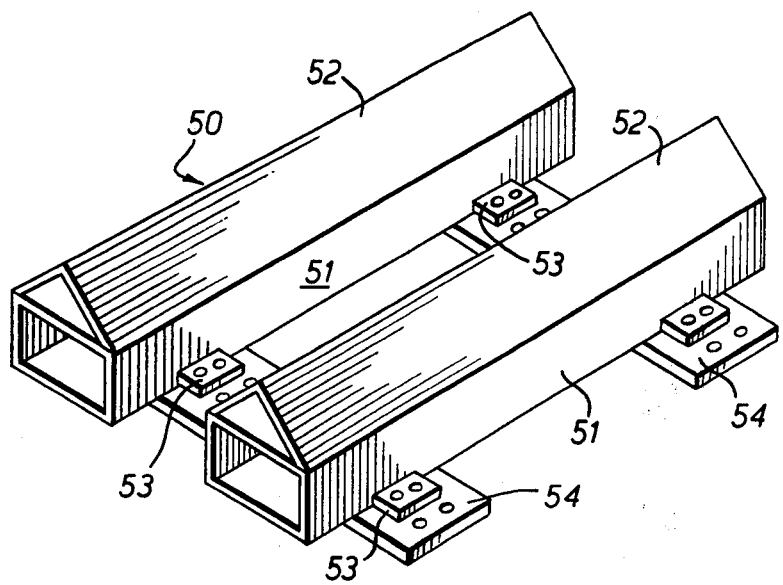

FIG. 20 shows a support assembly 50 comprising two box-section steel beams 51 upon each of which is superimposed an angle section 52 welded to the box section beam. Apertured lugs 53 may be welded to beams 51 to provide a means of securing the beams to apertured plates 54 permitting the two beams to be disposed at a distance apart suitable to the load to be secured. Plates 54 are secured to the vehicle chassis members as before.

Figure 21:
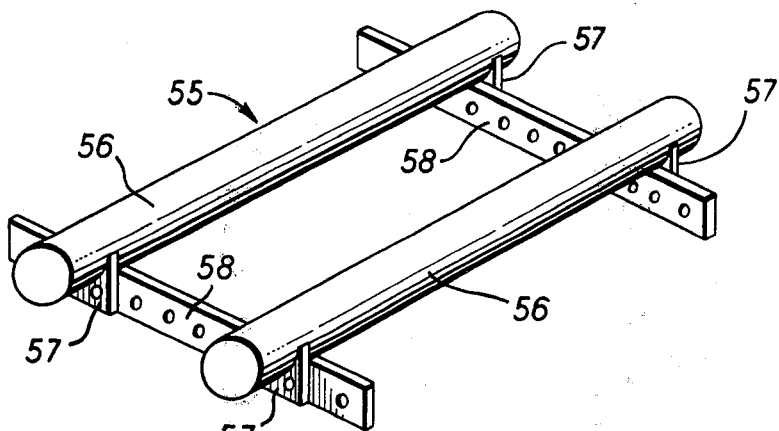

FIG. 21 shows a support assembly 55 consisting of two cylindrical beams 56 having lugs 57 welded to them by which they may be secured to apertured plates 58 which in turn are secured to the vehicle chassis members.

Figure 22:
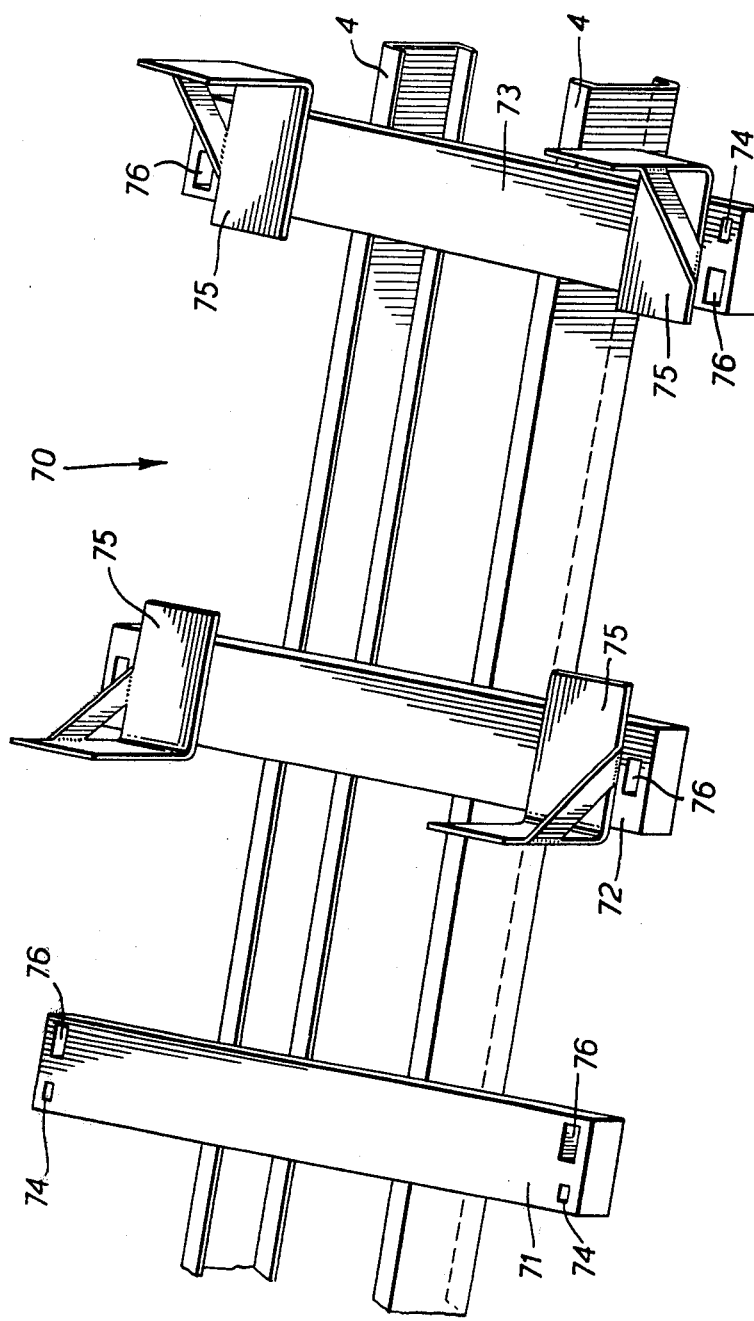

FIG. 22 shows a further embodiment of support assembly in accordance with the invention, by the use of which a vehicle chassis may be employed as a multipurpose vehicle. Thress general similar support members 71, 72, 73, formed as hollow steel beams of rectangular cross-section, are fastened by suitable means to the chassis members 4 of a carrying vehicle. Preferably the available length of chassis should be 6 meters, so as to allow the vehicle, when required, to carry a 6-meter standard container and also, if desired, to draw a 6-meter trailer, in conformity with the limits imposed by international road transport regulations.

Support members 71 and 73 are provided with twistlocks 74 for securing containers while intermediate support member 72 may provide additional support for the container and also serves, when provided with corner elements 75, and when support member 73 is also provided with cooperating corner elements 75 and the members 72, 73 are spaced apart by a distance to correspond to the length of a container to be carried, to restrain the container for transport.

The support members 71 – 73 are preferably provided with stanchion receiving pockets 76 in which portable stanchions or other road-retaining members may be inserted to assist in securing a load, as further described with reference to FIG. 23.

FIG. 23 shows a stanchion 80 consisting of a length of rectangular steel tube 80a, preferably having welded-on cover plates at its ends. The stanchion is provided with top and side hoops 80b, 80c for securing lashings or other load securing means. Stanchion 80 is mountable in a stanchion receiving pocket 76, assumed for convenience to be a part of support member 72. Pocket 76 comprises a short length 76a of rectangular steel tube of a size snugly to receive stanchion 80. The tube 76 is closed at its lower end and is welded to top plate 72a of support member 72 in a alignment with a hole in the plate. Preferably strengthening brackets formed of steel angle are welded to the tube 76a and to plate 72a, as shown at 76b.

FIG. 24 shows a form of support assembly 100 which is suitable when a distributed load, such as a container, is to be supported. The support member 100 comprises a C-section steel channel 101 provided with spaced holes 102 in its lower web, through which bolts or other fastenings may pass. The fastening may cooperate with a similarly apertured flat bar 103. Preferably the channel 101 is provided at the ends of its upper web with upstanding portions 103 to retain the load in position.

FIG. 25 shows a support assembly 110 formed by I-section rolled steel joist 111 again provided with mounting holes 112 and with upstanding load-retaining portions 113.

It will be understood that all the described embodiments of load support assembly include means for securing the assembly to the longitudinal chassis members of a carrying chassis.

A substantial advantage provided by load support assemblies in accordance with the invention is that they permit a chassis to be employed for many different purposes, since when assemblies arranged to support a flat-based load are secured to a chassis any of a very wide variety of types of body may be attached to the chassis.

What I claim is:
1. A multiple use chassis for transport vehicles, characterized by
   a. a pair of spaced apart parallel longitudinal chassis members;
   b. said chassis members having a load bearing length of at least 6 meters;
   c. a plurality of substantially flat parallel spaced apart transverse support members extending between said chassis members;
   d. said support members having a load bearing length of at least 2.5meters;
   e. at least one said support member being displaceable along said chassis members;
   f. each said support member having a plurality of connecting apertures adjacent said chassis members; and
   g. means extending through said apertures for connecting said support members to said chassis members.

2. A chassis in accordance with claim 1, wherein at least one of said support members has at each of its ends a receptacle for a stanchion, a rack member or other load-locating means.

3. A chassis in accordance with claim 1, wherein two of said support members are provided at the ends thereof with demountable corner elements serving to locate a standard container upon the chassis.

4. A chassis in accordance with claim 1, wherein no attachment to the chassis, other than said support members, extends above the level of the upper surface of said load-bearing length of said longitudinal members.

5. The apparatus of claim 1, further characterized by
   a. said apertures are a pair of spaced apart elongated slots.

6. The apparatus of claim 1, further characterized by
   a. each said support member including an integral flange extending along each side edge thereof; and
   b. said flanges extending at an angle upwardly from the top surface of its respective support member.

7. The apparatus of claim 6, further characterized by
   a. said flanges being L-shaped and connected at right angles to said support members.

8. The apparatus of claim 7, further characterized by
   a. a plurality of spaced cross braces extending between said flanges on each said support member.

* * * * *